(12) United States Patent
Lim (10) Patent No.: US 11,585,973 B2
(45) Date of Patent: Feb. 21, 2023

(54) BACKLIGHT UNIT AND DISPLAY DEVICE

(71) Applicant: LG Display Co., Ltd., Seoul (KR)

(72) Inventor: KiSung Lim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/501,748

(22) Filed: Oct. 14, 2021

(65) Prior Publication Data

US 2022/0187525 A1    Jun. 16, 2022

(30) Foreign Application Priority Data

Dec. 11, 2020   (KR) .......................... 10-2020-0173378

(51) Int. Cl.
   *F21V 8/00*   (2006.01)

(52) U.S. Cl.
   CPC ........... *G02B 6/0003* (2013.01); *G02B 6/009* (2013.01); *G02B 6/0051* (2013.01); *G02B 6/0055* (2013.01)

(58) Field of Classification Search
   CPC .............................. G02B 6/0003; G02B 6/0055
   See application file for complete search history.

(56) References Cited

U.S. PATENT DOCUMENTS

| | | | | |
|---|---|---|---|---|
| 2010/0110728 A1* | 5/2010 | Dubrow | .................... | G02B 1/10 252/301.36 |
| 2012/0170303 A1* | 7/2012 | Meir | .................... | G02B 6/0021 362/555 |
| 2014/0021440 A1* | 1/2014 | Mahan | .................... | H01L 33/58 257/13 |
| 2014/0022819 A1* | 1/2014 | Oh | ........................... | G02B 1/11 362/607 |
| 2014/0056024 A1* | 2/2014 | Kim | .................... | G02B 6/0035 428/323 |
| 2019/0204496 A1 | 7/2019 | Lee et al. | | |
| 2019/0324184 A1 | 10/2019 | Cai et al. | | |
| 2021/0208329 A1* | 7/2021 | Choi | ................. | G02F 1/133603 |

FOREIGN PATENT DOCUMENTS

| | | |
|---|---|---|
| JP | 2007-200877 A | 8/2007 |
| JP | 2016-110702 A | 6/2016 |
| WO | WO 2007/074932 A1 | 7/2007 |
| WO | WO 2020/055026 A1 | 3/2020 |

* cited by examiner

*Primary Examiner* — Keith G. Delahoussaye
(74) *Attorney, Agent, or Firm* — Birch, Stewart, Kolasch & Birch, LLP (57) ABSTRACT

A backlight unit and a display device in which the amount of light emitted to the top surface of the backlight unit is increased, are provided. The backlight unit includes light sources disposed on a printed circuit substrate, a reflective layer disposed on at least a partial area of an area in which the plurality of light sources are not disposed on the printed circuit substrate, a color conversion light guide layer disposed on the light sources, a non-color conversion light guide layer disposed on a surface of the color conversion light guide layer, a transparent film disposed on the color conversion light guide layer and the non-color conversion light guide layer and spaced apart from the light sources and the reflective layer, and light diffusion patterns disposed on a surface of the transparent film and corresponding to each light source.

17 Claims, 8 Drawing Sheets

BACKLIGHT UNIT AND DISPLAY DEVICE

CROSS REFERENCE TO RELATED APPLICATION

This application claims priority to Korean Patent Application No. 10-2020-0173378, filed on Dec. 11, 2020 in the Republic of Korea, the entire contents of which are hereby expressly incorporated by reference in its entirety into the present application.

BACKGROUND

Field of the Disclosure

The present disclosure relates to a backlight unit and a display device.

Description of the Background Art

With the development of the information society, there has been an increasing demand for a variety of types of display devices. In this regard, various display devices, such as liquid crystal display (LCD) devices, and organic light-emitting diode (OLED) display devices, have recently come into widespread use.

Among such display devices, the liquid crystal display device can include a display panel and a backlight unit supplying light to the display panel. In addition, the display panel receiving light from the backlight unit can adjust the brightness of the subpixels disposed on the display panel and display an image corresponding to an image data.

In recent years, the thickness of the backlight unit included in the liquid crystal display device is getting thinner due to the demand for a display device having a thin thickness. A method of arranging light sources more densely in order to evenly emit white light to a top surface of the backlight unit has been proposed, but there is a side effect of increasing the cost of parts. Accordingly, there is a need for a method to reduce the number of light sources needed for a backlight unit by preventing the light emitted from the light source from being trapped inside and spreading the emitted light more widely.

In addition, in the process of converting the wavelength of light emitted from the light source, if the distance between the color conversion phosphors for converting wavelengths is too close, some phosphors can be obscured by other phosphors. In this case, there can be a limitation in that color conversion efficiency can be lowered. Such a limitation can be more severe when a phosphor having a relatively large size and a phosphor having a relatively small size are mixed in a narrow area.

SUMMARY OF THE DISCLOSURE

Various aspects of the present disclosure provide a backlight unit and a display panel having a thin thickness capable of uniformly supplying white light to the top surface of the backlight unit without increasing the number of light sources disposed therein.

Various aspects of the present disclosure provide a backlight unit and a display panel having improved color conversion efficiency.

According to one aspect, a backlight unit includes a printed circuit substrate, a plurality of light sources disposed on the printed circuit substrate, a reflective layer disposed on at least a partial area of an area in which the plurality of light sources are not disposed on the printed circuit substrate, a color conversion light guide layer disposed on the plurality of light sources, a non-color conversion light guide layer disposed on at least one of a top surface or a bottom surface of the color conversion light guide layer on the plurality of light sources, a transparent film disposed above of the color conversion light guide layer and the non-color conversion light guide layer and spaced apart from the plurality of light sources and the reflective layer, and a plurality of light diffusion patterns disposed on at least one of the top or bottom of the transparent film and corresponding to each of the plurality of light sources.

According to another aspect, a backlight unit includes a printed circuit substrate, a plurality of light sources disposed on the printed circuit substrate, a reflective layer disposed on at least a partial area of an area in which the plurality of light sources are not disposed on the printed circuit substrate, a color conversion light guide layer disposed on the plurality of light sources, a non-color conversion light guide layer disposed on at least one of a top surface or a bottom surface of the color conversion light guide layer on the plurality of light sources, a transparent film disposed on of the color conversion light guide layer and the non-color conversion light guide layer and spaced apart from the plurality of light sources and the reflective layer, and a plurality of light diffusion patterns disposed on at least one of the top or bottom of the transparent film and corresponding to each of the plurality of light sources.

According to another aspect, a display device includes a display panel, and a backlight unit to supply light to the display panel. The backlight unit includes a printed circuit substrate, a plurality of light sources disposed on the printed circuit substrate, a reflective layer disposed on at least a partial area of an area in which the plurality of light sources are not disposed on the printed circuit substrate, a color conversion light guide layer disposed on the plurality of light sources, a transparent film disposed on the color conversion light guide layer and spaced apart from the plurality of light sources and the reflective layer, and a plurality of light diffusion patterns disposed on at least one of the top or bottom of the transparent film and corresponding to each of the plurality of light sources.

According to exemplary aspects, a backlight unit and a display panel having a thin thickness is capable of uniformly supplying white light to the top surface of the backlight unit without increasing the number of light sources disposed therein.

According to exemplary aspects, a backlight unit and a display panel can have improved color conversion efficiency.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description can make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together. Further, the terms such as "located on", "positioned on", "disposed above", etc. can be interchangeably used with "disposed on" as "on" may not represent directly on, and "on" represents that one or more layers can be disposed between the recited elements.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

Hereinafter, exemplary aspects will be described in detail with reference to the accompanying drawings.

Figure 1:
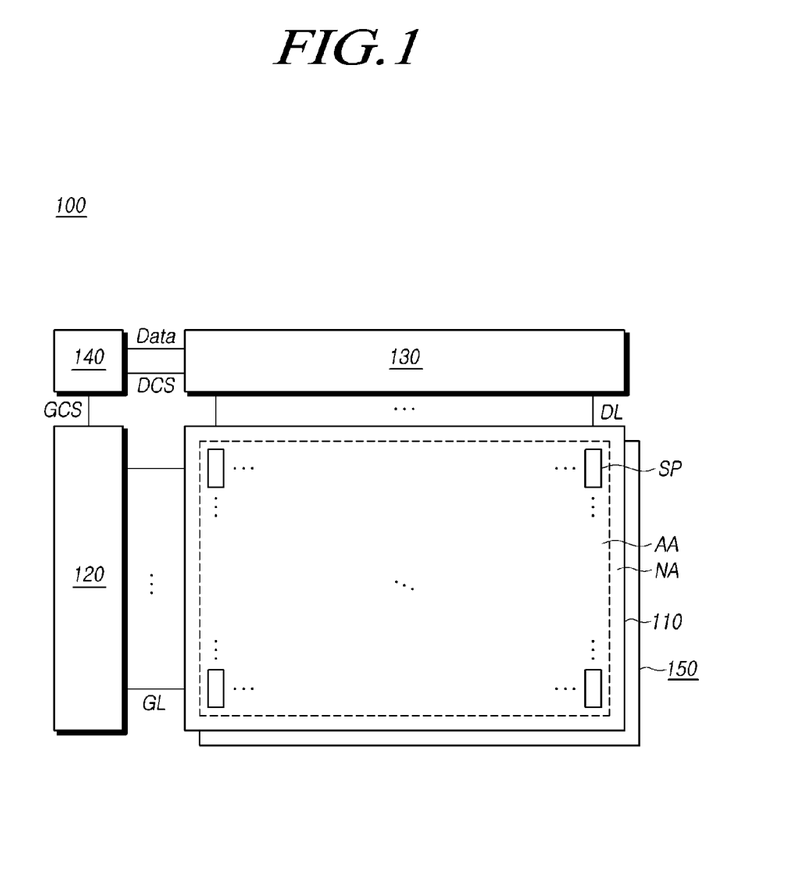
FIG. 1 illustrates a schematic configuration of a display device according to embodiments of the present disclosure.

FIG. 1 illustrates a schematic configuration of a display device according to embodiments of the present disclosure. All the components of each display device according to all embodiments of the present disclosure are operatively coupled and configured.

Referring to FIG. 1, a display device 100 according to the embodiments of the present disclosure can comprise a display panel 110 including an active area AA where a plurality of subpixels SP are disposed and a non-active area NA which is disposed outside the active area AA. Furthermore, the display device 100 can comprise a gate driving circuit 120, a data driving circuit 130, and a controller 140 for driving the display panel 110.

A plurality of gate lines GL and a plurality of data lines DL can be arranged on the display panel 110, and the plurality of subpixels SP can be disposed in the areas where the gate lines GL and the data lines DL intersect each other.

The gate driving circuit 120 is controlled by the controller 140, and sequentially outputs scan signals to a plurality of gate lines GL arranged on the display panel 110, thereby controlling the driving timing of a plurality of subpixels SP.

The gate driving circuit 120 can comprise one or more gate driver integrated circuits GDIC, and can be disposed only at one side of the display panel 110, or can be disposed at both sides thereof according to a driving method.

Each gate driver integrated circuit GDIC can be connected to a bonding pad of the display panel 110 by a tape automated bonding TAB method or a chip-on-glass COG method, or can be implemented by a gate-in-panel GIP method to then be directly arranged on the display panel 110. In some cases, the gate driver integrated circuit GDIC can be integrated and arranged on the display panel 110. In addition, each gate driver integrated circuit GDIC can be implemented by a chip-on-film COF method in which an element is mounted on a film connected to the display panel 110.

The data driving circuit 130 receives image data from the controller 140 and converts the image data into an analog data voltage. Then, the data driving circuit 130 outputs the data voltage to each data line DL according to the timing at which the scan signal is applied through the gate line GL so that each of the plurality of subpixels SP emits light having brightness according to the image data.

The data driving circuit 130 can comprise one or more source driver integrated circuits SDIC.

Each source driver integrated circuit SDIC can comprise a shift register, a latch circuit, a digital-to-analog converter, an output buffer, and the like.

Each source driver integrated circuit SDIC can be connected to a bonding pad of the display panel 110 by a tape automated bonding TAB method or a chip-on-glass COG method, or can be directly disposed on the display panel 110. Alternatively, in some cases, the source driver integrated circuit SDIC can be integrated and arranged on the display panel 110. In addition, each source driver integrated circuit SDIC can be implemented by a chip-on-film COF method in which each source driver integrated circuit SDIC can be mounted on a film connected to the display panel 110, and can be electrically connected to the display panel 110 through wires on the film.

The controller 140 supplies various control signals to the gate driving circuit 120 and the data driving circuit 130, and controls the operation of the gate driving circuit 120 and the data driving circuit 130.

The controller 140 can be mounted on a printed circuit board, a flexible printed circuit, or the like, and can be electrically connected to the gate driving circuit 120 and the data driving circuit 130 through the printed circuit board, the flexible printed circuit, or the like.

The controller 140 allows the gate driving circuit 120 to output a scan signal according to the timing implemented in each frame, and converts a data signal received from the outside to conform to the data signal format used in the data driving circuit 130 and then outputs the converted image data to the data driving circuit 130.

The controller 140 receives, from the outside (e.g., a host system), various timing signals including a vertical synchronization signal VSYNC, a horizontal synchronization signal HSYNC, an input data enable DE signal, a clock signal CLK, and the like, as well as the image data.

The controller 140 can generate various control signals using various timing signals received from the outside, and can output the control signals to the gate driving circuit 120 and the data driving circuit 130.

For example, in order to control the gate driving circuit 120, the controller 140 outputs various gate control signals GCS including a gate start pulse GSP, a gate shift clock GSC, a gate output enable signal GOE, or the like.

The gate start pulse GSP controls operation start timing of one or more gate driver integrated circuits GDIC constituting the gate driving circuit 120. The gate shift clock GSC, which is a clock signal commonly input to one or more gate driver integrated circuits GDIC, controls the shift timing of a scan signal. The gate output enable signal GOE specifies timing information on one or more gate driver integrated circuits GDIC.

In addition, in order to control the data driving circuit 130, the controller 140 outputs various data control signals DCS including a source start pulse SSP, a source sampling clock SSC, a source output enable signal SOE, or the like.

Each of the plurality of subpixels SP can be an area defined by the intersection of the gate line GL and the data line DL, and a liquid crystal or a light-emitting element can be disposed therein depending on the type of the display device 100.

For example, in the case that the display device 100 is a liquid crystal display device, the display device 100 can comprise a light source device such as a backlight unit 150 for emitting light to the display panel 110, and a liquid crystal can be disposed in the subpixel SP of the display panel 110. In addition, since the arrangement of the liquid crystal is adjusted by the electric field produced due to the data voltage applied to each subpixel SP, the brightness according to image data can be realized, thereby displaying images.

Figure 2:
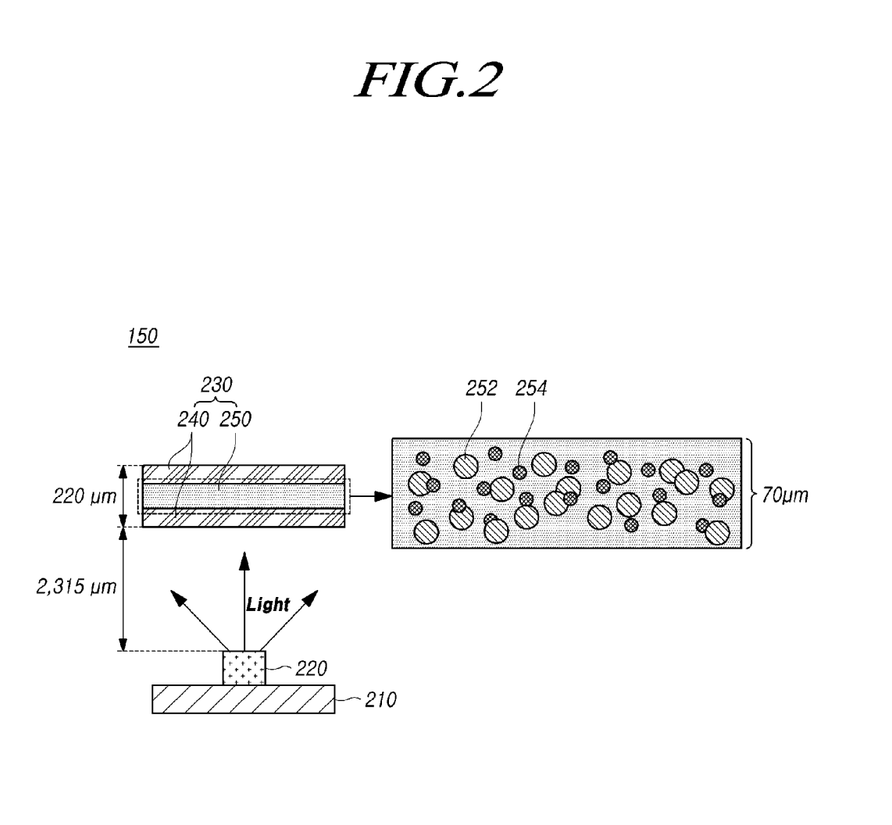
FIG. 2 illustrates an example of some components of a backlight unit included in a display device according to embodiments of the present disclosure.

FIG. 2 illustrates an example of some components of a backlight unit included in a display device according to embodiments of the present disclosure.

Referring to FIG. 2, the backlight unit 150 includes a plurality of light sources 220 disposed on the printed circuit substrate 210 and a color conversion sheet 230 capable of converting the wavelength of emitted light from the plurality of light sources 220 in order to supply white light from the top surface.

The color conversion sheet 230 of the backlight unit 150 is located spaced apart from the light source 220. A resin layer, a light diffusion film, a light guide plate, and the like can be positioned between the light source 220 and the color conversion sheet 230.

In the backlight unit 150, the distance between the light source 220 and the color conversion sheet 230 is quite large, for example, 2,315 µm due to the resin layer, the light diffusion film, the light guide plate, etc.

The color conversion sheet 230 can include the color conversion layer 250 such as a phosphor layer and the PET film 240 which is attached on the top and the bottom surfaces of the color conversion layer 250.

The PET film 240 of the color conversion sheet 230 is attached to the top and the bottom surfaces of the color conversion layer 250 to be disposed in the backlight unit 150 so that the color conversion sheet 230 can stably disposed in the backlight unit 150 and a function of protecting the color conversion layer 250 can be performed.

The light source 220 disposed on the printed circuit substrate 210 can be a light source 220 emitting light of a first wavelength, and the first wavelength can be a wavelength of blue light.

The color conversion layer 250 can include a phosphor which is excited by the light of the first wavelength and emits light of a second wavelength, and a phosphor which is excited by the light of the first wavelength and emits light of a third wavelength.

Optionally, the second wavelength can be a wavelength of red light, and the third wavelength can be a wavelength of green light, or vice versa. Hereinafter, for convenience of description, it is assumed that the second wavelength is the wavelength of red light and the third wavelength is the wavelength of green light.

The color conversion layer 250 of the color conversion sheet 230 can include a plurality of red phosphors 252 and a plurality of green phosphors 254, and these phosphors are excited by blue light emitted from the light source 220. These phosphors can emit red light or green light, respectively.

At least a portion of the blue light emitted from the light source 220 passes through the color conversion layer 250 of the color conversion sheet 230 and is converted to the red light or the green light to be emitted to the top surface of the backlight unit 150. A portion of the blue light emitted from the light source 220 passes through the color conversion layer 250 of the color conversion sheet 230 to be emitted to the top surface of the backlight unit 150 without color conversion.

In addition, in order to sufficiently convert the blue light emitted from the light source 220 into the red light and the green light, the color conversion layer 250 includes the plurality of red phosphors 252 and the green phosphor 254 as described above.

The thickness of the color conversion sheet 230 including the PET film 240 and the color conversion layer 250 can be slightly different depending on the applied product, but can reach, for example, 220 µm. In this case, the thickness of the color conversion layer 250 in which the actual wavelength is converted can be only about 70 µm.

In order to provide thinner backlight unit 150, the thickness of the color conversion sheet 230 is advantageously as thin as possible, so it is preferable that the thickness of the color conversion layer 250 is also thin.

However, as the thickness of the color conversion layer 250 is reduced, the plurality of red phosphors 252 and green phosphors 254 are concentrated in the color conversion layer 250, and the average distance between the phosphors 252 and 254 is small, and there is a problem that color conversion efficiency is lowered.

In particular, when the sizes of the red phosphor 252 and the green phosphor 254 are different, the light conversion efficiency of the phosphor having a relatively smaller size can be further reduced. For example, when the average size of the red phosphor 252 is larger than the average size of the green phosphor 254, the smaller green phosphor 254 is covered by the red phosphor 252, so that the light conversion efficiency of the green phosphor 254 can be further reduced.

Further, as the average distance between the red phosphor 252 and the green phosphor 254 becomes closer, at least a portion of the green light emitted from the green phosphor 254 excites the red phosphor 252 to emit the red light. Accordingly, the amount of the green light can be smaller than intended.

For example, in the case of the backlight unit 150 including the color conversion sheet 230 of a thin thickness, the amount of the green light emitted to the top surface of the backlight unit 150 can be further reduced. Hereinafter, the embodiment to increase the amount of the green light emitted to the top surface of the backlight unit 150 will be described below.

Figure 3:
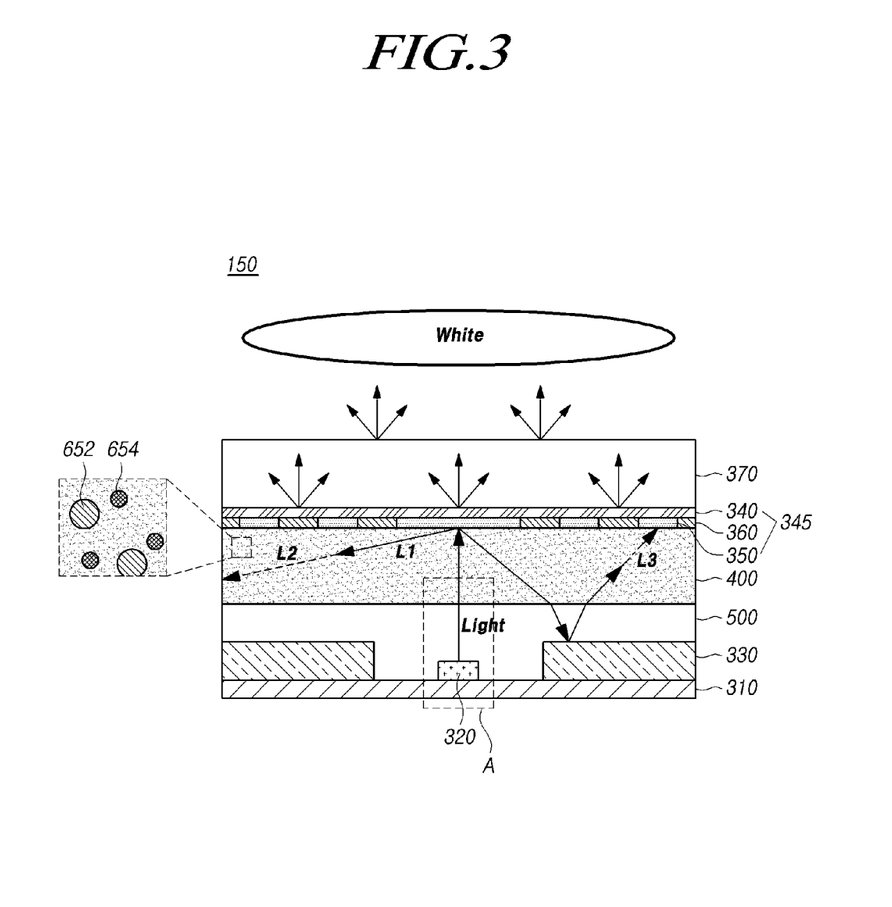
FIG. 3 is a partial cross-sectional view of a backlight unit according to an embodiment of the present disclosure.

FIG. 3 is a partial cross-sectional view of a backlight unit according to an embodiment of the present disclosure.

Referring to FIG. 3, a backlight unit 150 according to an embodiment includes a printed circuit substrate 310, a plurality of light sources 320 disposed on the printed circuit substrate 310, a reflective layer 330, and a color conversion light guide layer 400, a non-color conversion light guide layer 500, a transparent film 340, light diffusion patterns 350, and the like.

The reflective layer 330 is disposed on at least a partial area of an area in which the plurality of light sources 320 are not disposed on the printed circuit substrate 310. The reflective layer 330 can reflect light incident thereon to increase the light efficiency of the backlight unit 150.

A color conversion light guide layer 400 and a non-color conversion light guide layer 500 can be positioned on the plurality of light sources 320.

As shown in FIG. 3, the non-color conversion light guide layer 500 covers the light source 320 and the reflective layer 330, and the color conversion light guide layer 400 can be positioned on the non-color conversion light guide layer 500. Alternatively, the color conversion light guide layer 400 can cover the light source 320 and the reflective layer 330, and the non-color conversion light guide layer 500 can be positioned on the color conversion light guide layer 400.

In this structure, the light guide layer of any one of the color conversion light guide layer 400 and the non-color conversion light guide layer 500 is spaced apart from the plurality of light sources 320 and a reflective layer 330 on the printed circuit substrate 310.

The plurality of light diffusion patterns 350 is disposed on and spaced apart from the color conversion light guide layer 400 and the non-color conversion light guide layer 500. The light diffusion pattern 350 is formed on at least one surface of the transparent film 340. Hereinafter, the transparent film 340 and the light diffusion pattern 350 can be referred to as a light diffusion film 345

The plurality of light diffusion patterns 350 diffract, reflect, and refract at least a portion of the light emitted from the light source 320, so that a hot spot in which the light is non-uniformly emitted to the top surface of the backlight unit 150 can be alleviated. Accordingly, the light whose path is changed by the plurality of light diffusion patterns 350 can be directed toward the printed circuit substrate 310.

An adhesive 360 for stably disposing the light diffusion film 345 can be disposed on at least one surface of the light diffusion film 345. The adhesive 360 can be a transparent adhesive member.

A light guide plate 370 can be positioned on the light diffusion film 345. Light passing through the light diffusion film 345 on which the plurality of light diffusion patterns 350 are formed is diffused in the light guide plate 370, and white light can be uniformly emitted to the top surface of the backlight unit 150.

The color conversion light guide layer 400 is positioned between the plurality of light sources 320 and the light diffusion film 345, and can convert wavelengths of some of the light emitted from the plurality of light sources 320. The color conversion light guide layer 400 can be made of a specific material such as a resin, and can include a plurality of color conversion phosphors 652 and 654 for performing a color conversion function.

The non-color conversion light guide layer 500 for performing a light diffusion function can be positioned on at least one of the top and the bottom surfaces of the color conversion light guide layer 400. Referring to FIG. 3, the non-color conversion light guide layer 500 can be positioned on the top surface of the color conversion light guide layer 400. However, the non-color conversion light guide layer 500 can be positioned on the bottom surface of the color conversion light guide layer 400. The non-color conversion light guide layer 500 can be made of a specific material such as a resin, and the first refractive index n1 of the resin included in the non-color conversion light guide layer 500 can be different from the second refractive index n2 of the resin included in the color conversion light guide layer 400.

For example, the refractive index of the color conversion light guide layer 400 and the refractive index of the non-color conversion light guide layer 500 can be different from each other.

As described above, the non-color conversion light guide layer 500 can be positioned on the top surface of the color conversion light guide layer 400, and the color conversion light guide layer 400 can be located on the top surface of the non-color conversion light guide layer 500. Hereinafter, for convenience of description, an embodiment in which the color conversion light guide layer 400 is positioned on the top surface of the non-color conversion light guide layer 500 will be described as an example.

When the color conversion light guide layer 400 is positioned on the top surface of the color conversion light guide layer 500, the color conversion light guide layer 500 can be positioned to cover the plurality of light sources 320. As the color conversion light guide layer 400 or the non-color conversion light guide layer 500 is positioned to cover the plurality of light sources 320, thereby protecting the plurality of light sources 320 from external impact.

Further, in some cases, the non-color conversion light guide layer 500 covering the plurality of light sources 320 can cover a top surface of the reflective layer 330 and can contact a portion of a side surface of the reflective layer 330.

At least a portion of the light emitted from the light source 320 can have a wavelength converted while passing through the color conversion light guide layer 400. For example, at least a portion of the blue light L1 emitted from the light source 320 can excite the phosphors 652 or 654 included in the color conversion light guide layer 400 to emit red light L2 or green light L3.

The blue light L1, red light L2, and green light L3 can be mixed while passing through the light guide plate 370. High-quality white light can be supplied to the top surface of the backlight unit 150.

Figure 4:
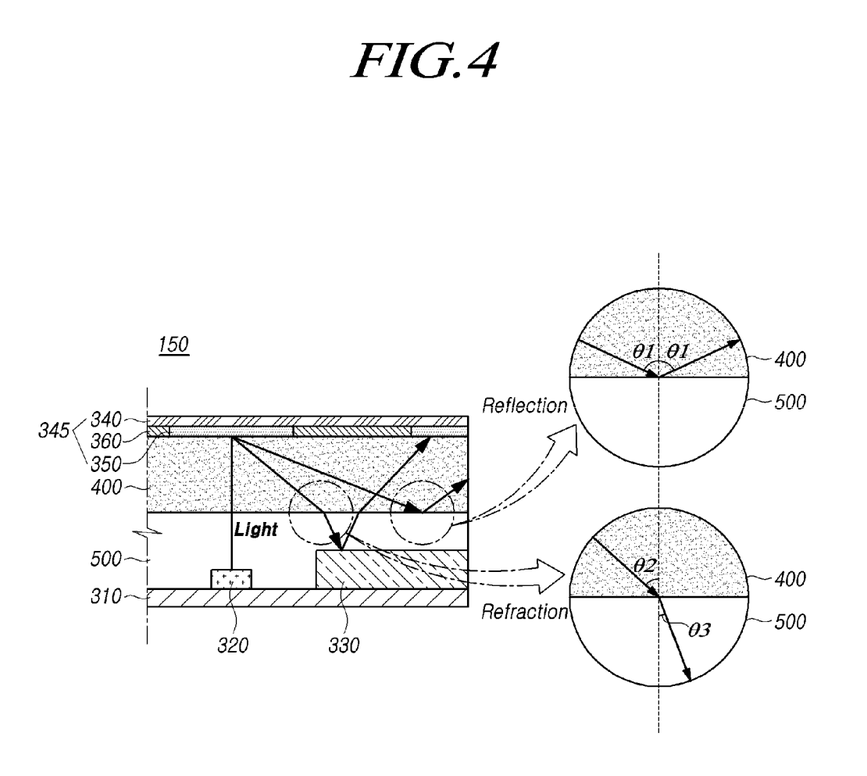
FIG. 4 is a view exemplarily showing how light travels between a color conversion light guide layer and a non-color conversion light guide layer according to an embodiment of the present disclosure.

FIG. 4 is a view exemplarily showing how light travels between a color conversion light guide layer and a non-color conversion light guide layer according to an embodiment of the present disclosure.

Referring to FIG. 4, refractive indexes of the color conversion light guide layer 400 and the non-color conversion light guide layer 500 can be different from each other.

The first refractive index of the color conversion light guide layer 400 can be referred to the absolute refractive index n1 and the second refractive index of the color conversion light guide layer can be referred to the absolute refractive index n2.

Since the absolute refractive index n2 of the color conversion light guide layer 400 is different from the absolute refractive index n1 of the non-color conversion light guide layer 500, the light incident from the color conversion light guide layer 400 to the non-color conversion light guide layer 500 or the light incident from the non-color conversion light guide layer 500 to the color conversion light guide layer 400 can be refracted at an interface between the color conversion light guide layer 400 and the non-color conversion light guide layer 500.

On the other hand, when light travels from the color conversion light guide layer 400 having an absolute refractive index n2 to the non-color conversion light guide layer 500 having an absolute refractive index n1, Snell's law is accomplished between the absolute refractive index n1, n2, the angles i, r of incidence and refraction as follows:

$$\frac{\sin i}{\sin r} = \frac{n_1}{n_2} \quad \text{[Equation 1]}$$

The angle of incidence i refers to the angle formed by the light incident from the color conversion light guide layer 400 to the non-color conversion light guide layer 500 with the normal of the interface between there, and the angle of refraction r refers to the angle formed by the light emitted to the non-color conversion light guide layer 500 with the normal of the interface between there.

According to Snell's law, when the absolute refractive index n2 of the color conversion light guide layer 400 on which the light is incident is greater than the absolute refractive index n1 of the non-color conversion light guide layer 500, all of the light incident on the non-color conversion light guide layer 500 is reflected at the interface. This phenomenon can be referred to as total reflection.

Total reflection occurs when the incident angle i of the light exceeds the critical angle i'. The critical angle i' can be defined as the magnitude of the incident angle i when the refraction angle r is 90°.

For example, when the magnitude of the incident angle i exceeds the critical angle i', total reflection occurs, and the critical angle i' can be calculated using Snell's Law.

Specifically, when the refraction angle r is 90°, the incident angle i having a sin(i) value of n1/n2 with respect to the incident angle i corresponds to the critical angle i'. The critical angle i' can be calculated as arcsin(n1/n2).

Referring to FIG. 4, when the incident angle θ1 of light traveling from the color conversion light guide layer 400 to the non-color conversion light guide layer 500 is greater than the critical angle i', the light is totally reflected at the interface between the color conversion light guide layer 400 and the non-color conversion light guide layer 500. In this case, the angle of reflection is θ1 equal to the angle of incidence.

When the incident angle θ2 of the light traveling from the color conversion light guide layer 400 to the non-color conversion light guide layer 500 is smaller than the critical angle i', the light is incident to the non-color conversion light guide layer 500 with a refraction angle of θ3. In this case, the magnitude of the refraction angle θ3 is smaller than the magnitude of the incident angle θ2.

Figure 5:
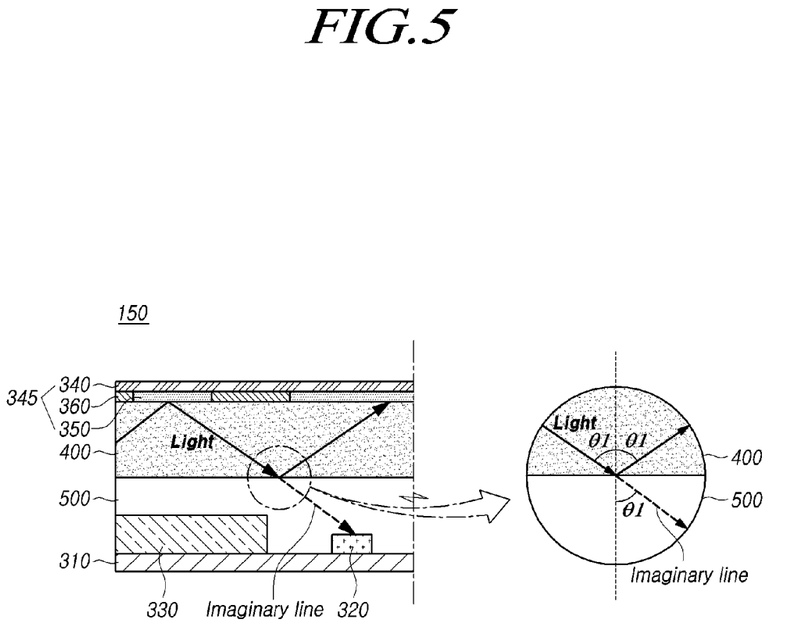
FIG. 5 illustrates a case in which total reflection occurs in the color conversion light guide layer of FIG. 4 in more detail.

FIG. 5 illustrates a case in which total reflection occurs in the color conversion light guide layer of FIG. 4 in more detail.

Referring to FIG. 5, a portion of the light emitted from the plurality of light sources 320 on the printed circuit substrate 310 is reflected and refracted by the plurality of light diffusion patterns 350 to be directed to the adjacent other light sources 320.

When the light reflected and refracted by the plurality of light diffusion patterns 350 is directed to an adjacent other light source 320 adjacent thereto, and the incident angle θ1 is greater than the critical angle i', the light can be totally reflected at the interface between the color conversion light guide layer 400 and the non-color conversion light guide layer 500 as described above.

Therefore, the backlight unit 150 can totally reflect a portion of the light directed to the top surface of the light source or the area other than the reflective layer 330 on the printed circuit substrate 310, for example, the top surface of the light source 320, thereby increasing the light efficiency. For example, the backlight unit 150 according to the embodiment can improve light efficiency by emitting more light emitted from the light source 320 to the top surface thereof.

Furthermore, as the average time for the light emitted from the plurality of light sources 320 to pass through the color conversion light guide layer 400 through its reflection and refraction increases, the color conversion efficiency of the light emitted from the light sources 320 can be improved.

Accordingly, even if the backlight unit 150 uses a smaller number of color conversion phosphors 652 and 654, it supplies high-quality white light, thereby reducing its manufacturing costs.

Figure 6:
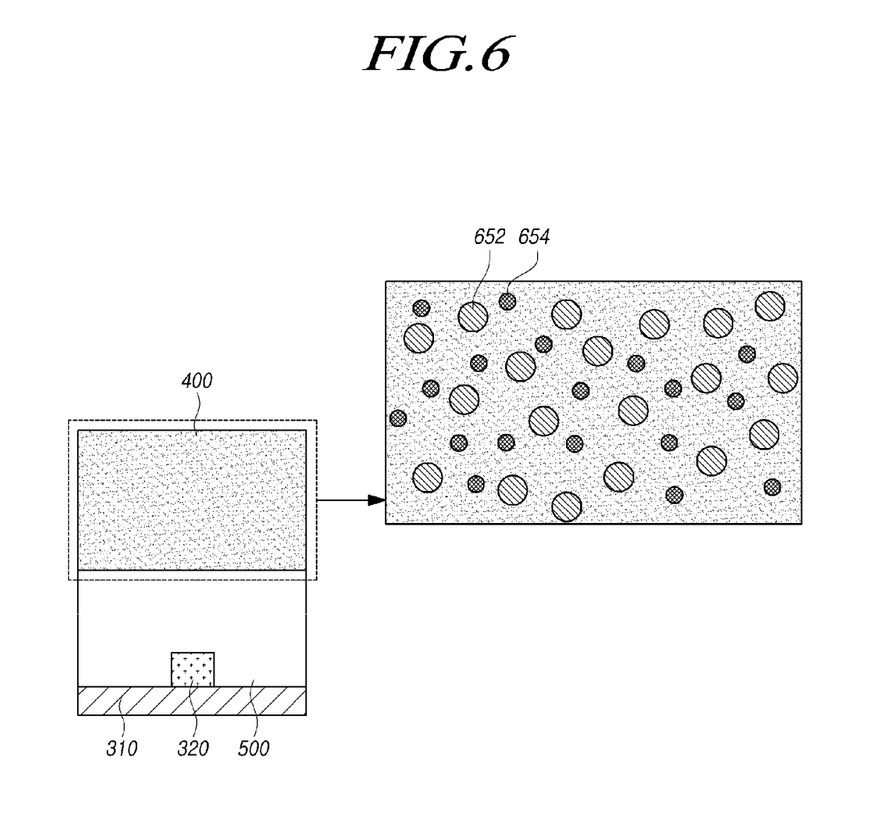
FIG. 6 is an enlarged view of area A of FIG. 3.

FIG. 6 is an enlarged view of area A of FIG. 3.

Referring to FIG. 6, the color conversion light guide layer 400 can include the plurality of color conversion phosphors 652 and 654 as mentioned above.

The plurality of color conversion phosphors 652 and 654 included in the color conversion light guide layer 400 can be a phosphor which is excited by the light of the first wavelength emitted from the light source 320 to emit light of the second wavelength or a phosphor which is excited by light of a first wavelength and emits light of a third wavelength.

The first wavelength can be a wavelength of blue light, the second wavelength can be a wavelength of red light, and the third wavelength can be a wavelength of green light. The phosphor emitting light of the second wavelength can be the red phosphor 652, and the phosphor emitting light of the third wavelength can be the green phosphor 654.

The portion of the light emitted from the light source 320 by the red phosphor 652 and the green phosphor 654 included in the color conversion light guide layer 400 is color-converted, so that the top surface of the backlight unit 150 can supply the white light.

Referring to FIGS. 2 and 6, the red phosphor 652 and the green phosphor 654 included in the color conversion light guide layer 400 can be the same material as the red phosphor 252 and the green phosphor 254 included in the color conversion sheet 230 described above.

The plurality of red phosphors 652 and green phosphors 654 are included in the color conversion light guide layer 400 of the backlight unit 150, and the distance between the phosphors 652 and 654 can be greater than the distance between the red phosphor 252 and the green phosphor 254 in the color conversion layer 250 of the color conversion sheet 230.

In other words, the thickness of the color conversion light guide layer 400 of the backlight unit 150 can be thicker than the thickness of the color conversion layer 250 of the color conversion sheet 230.

Even when the color conversion sheet 230 is removed from the backlight unit 150, as the color conversion light guide layer 400 including a phosphor is disposed between the light source 320 and the light diffusion pattern 350, the backlight unit 150 can be thinner. And since the color conversion light guide layer 400 and the non-color conversion light guide layer 500 having different refractive indices are included, the light reflected to the lower surface by the light diffusion pattern 350 is totally reflected and can be directed back to the upper surface of the backlight unit 150. Accordingly, the number of required light sources 320 can be reduced.

As the thickness of the color conversion light guide layer 400 including the plurality of color conversion phosphors 652 and 654 increases, the distance between the plurality of color conversion phosphors 652 and 654 also increases. Therefore, the color conversion efficiency of the color conversion light guide layer 400 can be improved.

In addition, as the distance between the plurality of color conversion phosphors 652 and 654 increases, the color conversion efficiency of the green phosphor 654, which is relatively small compared to the red phosphor 652, increases. Accordingly, more even white light can be supplied to the top surface of the backlight unit 150, and thus the backlight unit 150 with improved quality can be provided.

Meanwhile, the thickness of the color conversion light guide layer 400 can be greater than the thickness of the non-color conversion light guide layer 500. Since the thickness of the color conversion light guide layer 400 is thicker than the thickness of the non-color conversion light guide layer 500, the light emitted from the light source 320 can pass through the color conversion light guide layer 400 for a relatively long time. Accordingly, the color conversion efficiency of the light emitted from the light source 320 can increase, and more even white light can be supplied to the top surface of the backlight unit 150.

Figure 7:
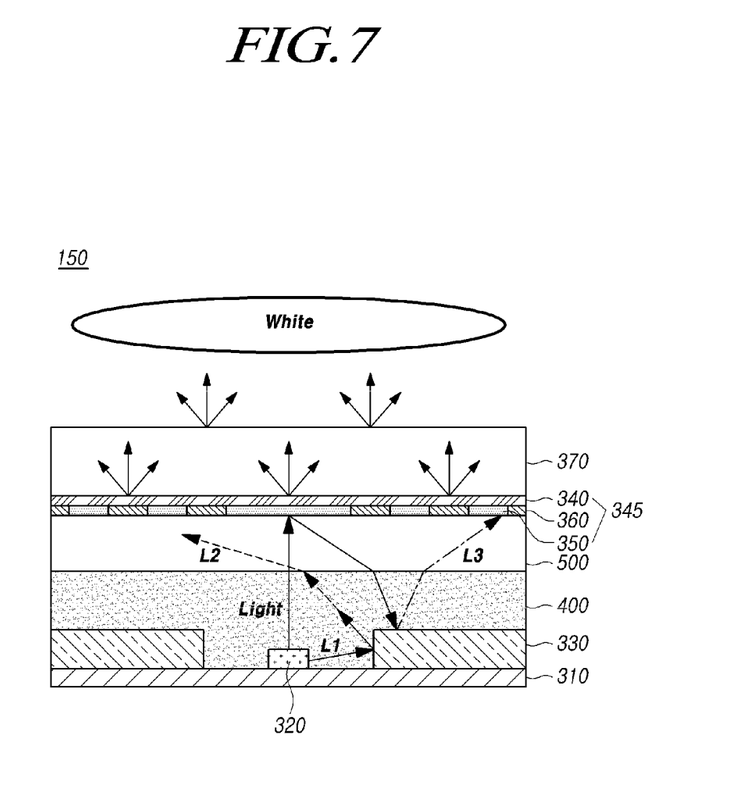
FIG. 7 is a partial cross-sectional view of a backlight unit according to another embodiment of the present disclosure.

FIG. 7 is a partial cross-sectional view of a backlight unit according to another embodiment of the present disclosure.

Referring to FIG. 7, in a backlight unit 150 according to another embodiment of the present disclosure, the color conversion light guide layer 400 is disposed to cover the plurality of light sources 320 on the printed circuit substrate 310, and a non-color conversion light guiding layer 500 is disposed on the top surface of 400 of the color conversion light guide layer 400.

Since the description of the other configuration is the same as the description of the aforementioned configuration, a description thereof will be omitted or briefly provided.

When the refractive index of the color conversion light guide layer 400 is n3, and the refractive index of the non-color conversion light guide layer 500 positioned above the color conversion light guide layer 400 is n4, a relationship of them can be n4>n3.

In other words, in the backlight unit 150, the refractive index n4 of the non-color conversion light guide layer 500 is greater than the refractive index n3 of the color conversion light guide layer 400.

Accordingly, a portion of the light incident from the non-color conversion light guide layer 500 positioned on the top portion to the color conversion light guide layer 400 is totally reflected and can be directed toward the top surface of the backlight unit 150 again. Accordingly, the amount of light directed toward the area where the reflective layer 330 is not located on the printed circuit substrate 310 can be reduced, and thus the amount of light emitted to the top surface of the backlight unit 150 can increase.

On the other hand, due to the difference in refractive index between the color conversion light guide layer 400 and the non-color conversion light guide layer 500, the light incident from the bottom to the top is diffused away from the light source 320 in the horizontal direction.

The above described diffusion effect will be described with reference to the L1 light path shown in FIG. 7. The L1 light can be emitted from the light source 320 to be reflected from the side surface of the reflective layer 330 and refracted at the interface between the color conversion light guide layer 400 and the non-color conversion light guide layer 500.

In particular, when the plurality of light sources 320 are arranged in a flip-chip structure on the printed circuit substrate 310, a mount of light emitted to the bottom surface or the side surface of the light source 320 can increase, and the light reflected from the side of the reflective layer 330 can be refracted at the interface between the color conversion light guide layer 400 and the non-color conversion light guide layer 500 to be more easily diffused.

The flip-chip structure of the plurality of light sources 320 can be applied to both a case in which the color conversion light guide layer 400 covers the plurality of light sources 320 and a case in which the non-color conversion light guide layer 500 covers the plurality of light sources 320.

In summary, as light travels from a medium with a low refractive index to a medium with a high refractive index and the refraction angle becomes larger than the incident angle, the light emitted from the light source 320 diffuses toward the top surface of the backlight unit 150.

Accordingly, the amount of light emitted to the top surface of the light source 320 in the vertical direction with respect to the backlight unit 150 is relatively reduced, and the amount of light emitted to the top surface of the area between the plurality of light sources 320 can be relatively increased.

Accordingly, in the backlight unit 150 according to the embodiment of the present disclosure, the difference in luminance between regions on the top surface of the backlight unit 150 can be reduced, so that the hot spot can be alleviated.

Figure 8:
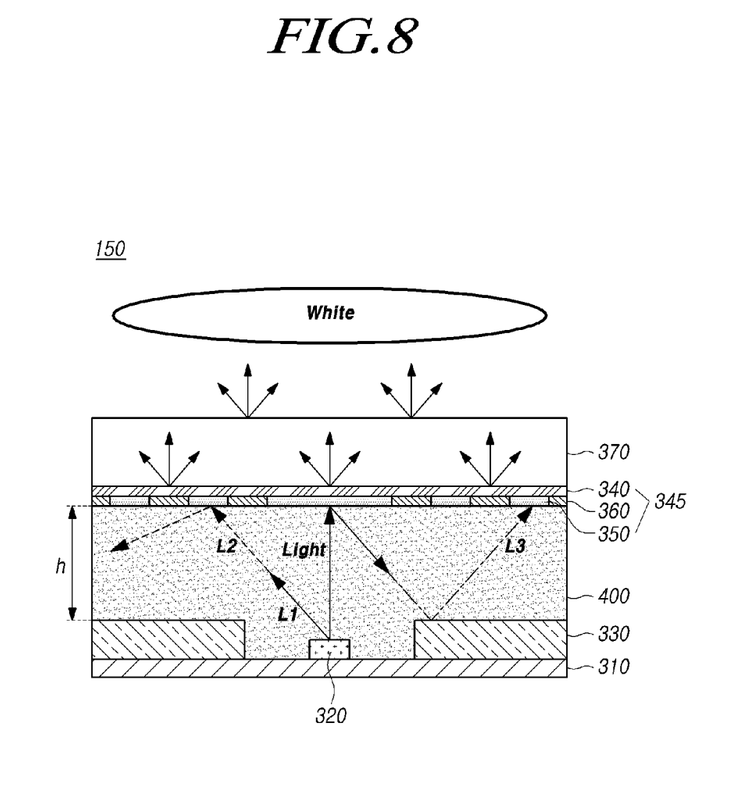
FIG. 8 illustrates a backlight unit according to further another embodiment of the present disclosure.

FIG. 8 illustrates a backlight unit according to further another embodiment of the present disclosure.

Referring to FIG. 8, a backlight unit 150 according to further another embodiment of the present disclosure includes a light diffusion film 345 including a color conversion light guide layer 400 covering a plurality of light sources 320 and a reflective layer 330 on a printed circuit substrate 310, and, a plurality of light diffusion patterns 350 positioned on the top surface of the color conversion light guide layer 400.

In the backlight unit 150 according to further another embodiment, the distance h from the top surface of the reflective layer 330 to the light diffusion film 345 including the plurality of light diffusion patterns 350 can reach a specific distance such as 500 μm, and the distance h can vary depending on the product to which the color conversion light guide layer 400 is applied.

Accordingly, light emitted from the plurality of light sources 320 can be converted into light of different wavelengths while passing through the color conversion light guide layer 400. For example, the wavelength of blue light L1 emitted from the plurality of light sources 320 can be converted into red light L2 and green light L3 while passing through the color conversion light guide layer 400.

In addition, in the backlight unit 150 according to further another embodiment, the distance between the plurality of color conversion phosphors 652 and 654 included in the color conversion light guide layer 400 increases, so that color conversion efficiency of them can be improved.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present disclosure.

The above description and the accompanying drawings provide an example of the technical idea of the present disclosure for illustrative purposes only. For example, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A backlight unit comprising:
   a printed circuit substrate;
   a plurality of light sources disposed on the printed circuit substrate;
   a reflective layer disposed on at least a partial area of an area in which the plurality of light sources are not disposed on the printed circuit substrate;
   a color conversion light guide layer disposed on the plurality of light sources;
   a transparent film disposed on the color conversion light guide layer and spaced apart from the plurality of light sources and the reflective layer;
   a plurality of light diffusion patterns disposed on at least one of a top or bottom of the transparent film, and corresponding to each of the plurality of light sources; and
   a non-color conversion light guide layer disposed on a top surface of the color conversion light guide layer that is disposed on the plurality of light sources,
   wherein the color conversion light guide layer covers the plurality of light sources and comprises a resin having a third refractive index, and
   the non-color conversion light guide layer is disposed on the color light guide layer, and comprises a resin having a fourth refractive index greater than the third refractive index.

2. A backlight unit comprising:
   a printed circuit substrate;
   a plurality of light sources disposed on the printed circuit substrate;
   a reflective layer disposed on at least a partial area of an area in which the plurality of light sources are not disposed on the printed circuit substrate;
   a color conversion light guide layer disposed on the plurality of light sources;
   a transparent film disposed on the color conversion light guide layer and spaced apart from the plurality of light sources and the reflective layer;
   a plurality of light diffusion patterns disposed on at least one of a top or bottom of the transparent film, and corresponding to each of the plurality of light sources; and
   a non-color conversion light guide layer disposed on a bottom surface of the color conversion light guide layer that is disposed on the plurality of light sources,
   wherein the color conversion light guide layer comprises a resin having a first refractive index, and
   wherein the non-color conversion light guide layer comprises a resin having a second refractive index smaller than the first refractive index.

3. The backlight unit of claim 2, wherein at least a portion of the light emitted from the plurality of light sources is totally reflected at an interface between the color conversion light guide layer and the non-color conversion light guide layer.

4. The backlight unit of claim 2,
   wherein the transparent film is disposed on the non-color conversion light guide layer.

5. The backlight unit of claim 2, wherein the plurality of light sources on the printed circuit substrate are disposed in a flip-chip structure,
   the non-color conversion light guide layer covers the plurality of light sources, and
   the color conversion light guide layer is disposed on the top surface of the non-color conversion light guide layer.

6. The backlight unit of claim 2, wherein a thickness of the color conversion light guide layer is greater than a thickness of the non-color conversion light guide layer.

7. The backlight unit of claim 2, wherein one of the color conversion light guide layer and the non-color conversion light guide layer is spaced apart from the plurality of light sources and the reflective layer.

8. The backlight unit of claim 2, wherein the color conversion light guide layer comprises a plurality of color conversion phosphors mixed with the resin.

9. A display device comprising:
   a display panel; and
   a backlight unit to supply light to the display panel,
   wherein the backlight unit comprises:
     a printed circuit substrate;
     a plurality of light sources disposed on the printed circuit substrate;
     a reflective layer disposed on at least a partial area of an area in which the plurality of light sources are not disposed on the printed circuit substrate;
     a color conversion light guide layer disposed on the plurality of light sources;

a transparent film disposed on the color conversion light guide layer and spaced apart from the plurality of light sources and the reflective layer;

a plurality of light diffusion patterns disposed on at least one of a top or bottom of the transparent film and corresponding to each of the plurality of light sources; and a non-color conversion light guide layer disposed on at least one of a top surface or a bottom surface of the color conversion light guide layer that is disposed on the plurality of light sources, wherein the color conversion light guide layer covers the plurality of light sources and comprises a resin having a third refractive index, and the non-color conversion light guide layer comprises a resin having a fourth refractive index greater than the third refractive index.

10. A display device comprising:

a display panel; and a backlight unit to supply light to the display panel, wherein the backlight unit comprises:

a printed circuit substrate;

a plurality of light sources disposed on the printed circuit substrate;

a reflective layer disposed on at least a partial area of an area in which the plurality of light sources are not disposed on the printed circuit substrate;

a color conversion light guide layer disposed on the plurality of light sources;

a transparent film disposed on the color conversion light guide layer and spaced apart from the plurality of light sources and the reflective layer;

a plurality of light diffusion patterns disposed on at least one of a top or bottom of the transparent film and corresponding to each of the plurality of light sources; and a non-color conversion light guide layer disposed on a bottom surface of the color conversion light guide layer that is disposed on the plurality of light sources, wherein the color conversion light guide layer comprises a resin having a first refractive index, and wherein the non-color conversion light guide layer comprises a resin having a second refractive index smaller than the first refractive index.

11. The display device of claim 10, wherein the transparent film is disposed on the color conversion light guide layer and the non-color conversion light guide layer, and is spaced apart from the plurality of light sources and the reflective layer.

12. The display device of claim 10, wherein at least a portion of the light emitted from the plurality of light sources is totally reflected at an interface between the color conversion light guide layer and the non-color conversion light guide layer.

13. The display device of claim 10, wherein the non-color conversion light guide layer covers the plurality of light sources and is located below the color light guide layer.

14. The display device of claim 10, wherein the plurality of light sources on the printed circuit substrate are disposed in a flip-chip structure, the non-color conversion light guide layer covers the plurality of light sources, and the color conversion light guide layer is disposed on the top surface of the non-color conversion light guide layer.

15. The display device of claim 10, wherein a thickness of the color conversion light guide layer is greater than a thickness of the non-color conversion light guide layer.

16. The display device of claim 10, wherein the color conversion light guide layer comprises the resin mixed with a plurality of color conversion phosphors.

17. The display device of claim 10, wherein one of the color conversion light guide layer and the non-color conversion light guide layer is spaced apart from the plurality of light sources and the reflective layer.

* * * * *